United States Patent
Cairo et al.

[11] Patent Number: 6,098,871
[45] Date of Patent: Aug. 8, 2000

[54] PROCESS FOR BONDING METALLIC MEMBERS USING LOCALIZED RAPID HEATING

[75] Inventors: Ronald R. Cairo, Palm City; John M. Robertson, Tequesta; J. Carter Barone, Palm Beach Gardens; Dennis C. Stewart, Palm City, all of Fla.

[73] Assignee: United Technologies Corporation, Hartford, Conn.

[21] Appl. No.: 08/903,230

[22] Filed: Jul. 22, 1997

[51] Int. Cl.[7] .............................. B23K 20/02; B23K 31/12
[52] U.S. Cl. ....................... 228/194; 228/193; 228/234.1; 228/245; 228/249
[58] Field of Search ................................. 228/194, 234.1, 228/193, 245, 249

[56] References Cited

U.S. PATENT DOCUMENTS

| | | | |
|---|---|---|---|
| 3,678,570 | 7/1972 | Paulonis et al. | |
| 3,753,794 | 8/1973 | Paulonis et al. | 148/32 |
| 4,608,094 | 8/1986 | Miller et al. | 148/11.5 N |
| 4,614,296 | 9/1986 | Lesgourgues | 228/194 |
| 4,700,881 | 10/1987 | Ryan | 228/194 |
| 4,795,078 | 1/1989 | Kuroki et al. | 228/131 |
| 4,820,124 | 4/1989 | Fried | 416/191 |
| 4,909,859 | 3/1990 | Nazmy et al. | 148/11.5 N |
| 4,919,323 | 4/1990 | Mahoney et al. | 228/157 |
| 5,005,756 | 4/1991 | Muggeo et al. | 228/127 |
| 5,061,324 | 10/1991 | Chang | 148/11.5 N |
| 5,100,050 | 3/1992 | Krueger et al. | 228/265 |
| 5,106,010 | 4/1992 | Stueber et al. | 228/232 |
| 5,118,028 | 6/1992 | Ogawa et al. | 228/194 |
| 5,131,961 | 7/1992 | Sato et al. | 148/677 |
| 5,145,105 | 9/1992 | Floroski et al. | 228/194 |
| 5,176,499 | 1/1993 | Damlis et al. | 416/97 R |
| 5,272,809 | 12/1993 | Robertson et al. | |
| 5,273,708 | 12/1993 | Freeman | 419/35 |
| 5,312,497 | 5/1994 | Mathey | 148/675 |
| 5,374,319 | 12/1994 | Stueber et al. | 148/404 |
| 5,413,752 | 5/1995 | Kissinger et al. | 419/28 |
| 5,571,345 | 11/1996 | Ganesh et al. | 148/514 |
| 5,584,428 | 12/1996 | Satoh et al. | 228/194 |
| 5,699,955 | 12/1997 | Shimizu et al. | 228/194 |

OTHER PUBLICATIONS

"Welding Metallurgy", Linnert, vol. 1, p. 878, 1994.

*Primary Examiner*—Patrick Ryan
*Assistant Examiner*—Kiley Stoner
*Attorney, Agent, or Firm*—Bachman & LaPointe, P.C.

[57] ABSTRACT

The present invention relates to a process for joining two metal members together. The process comprises the steps of providing two parent metal members to be joined and a prealloyed interlayer foil having a melting point depressant; creating a joint interface by positioning the foil between two spaced apart surfaces of the two parent metal members to be joined together; applying a load substantially transverse to the joint interface which does not cause deformation of the surfaces; and applying localized rapid heating in the area of the joint interface at a temperature sufficient to effect bonding of the two metallic members while causing little or no degradation of microstructural or mechanical properties of the parent metal and a coarsening of grain size in rim portions of the metal members.

32 Claims, 3 Drawing Sheets

PROCESS FOR BONDING METALLIC MEMBERS USING LOCALIZED RAPID HEATING

BACKGROUND OF THE INVENTION

The present invention relates to a process for joining or bonding metallic materials together, particularly superalloy articles. The process of the present invention has particular utility in repairing blades, hollow disk fabrication, and drum rotor and disk hub repairs.

The pursuit of increased performance benefits and operating efficiency in current and emerging gas turbine engines requires a departure from conventional designs, materials, and manufacturing processes. As the engine operating environment becomes increasingly more hostile in terms of higher temperatures and rotational speeds, a systems approach involving consideration of structural load paths, geometries, materials, processes, and supportability (including repairability), must be undertaken if performance gains are to materialize. There are many situations in component design where dual property materials, multi-phase materials (e.g. wrought and single crystal alloys), and material joinability are beneficial because of unusual thermal gradients, vibratory concerns, inertia generated stresses or the need for deflection (or deformation) control. The use of these materials or processes is vital to ensure both structural and functional performance. Of these attributes, joinability offers the most potential because in addition to allowing the designer to utilize each material to its full potential, it provides more opportunities for the designer to develop innovative geometries that allow greater load capacity by virtue of unique load paths. Examples include: (1) Integrally Bladed Rotors (IBRs) for reduced rotor weight and increased durability; (2) Hollow Disks for increased AN2 capability and durability; (3) Dual Alloy or Dual Property Disks for maximum material utilization to provide enhanced creep capability in the rim and strength in the bore; and (4) Repairs for IBRs and Drum Rotor for improved supportability and reduced Life Cycle Costs.

It has long been the goal in fabricating high temperature articles to use bonding techniques that lend themselves to the fabrication of a high strength joint, particularly one which is defect free and which has a strength comparable to that of the articles being joined. One process which has been used to bond articles together is known as transient liquid phase bonding (TLP). In this process, boron nickel foil is placed between the articles to be bonded. The assembly of articles and foils is forced together and heated to a temperature at which the boronized portion of the interlayer foil melts but the articles being joined do not melt. When the assembly is held at an essentially constant temperature for some time the boron will diffuse into the unmelted portions of the assembly and eventually solidification will occur at the elevated temperature when the localized boron content is sufficiently reduced by diffusion. One form of TLP bonding is illustrated in U.S. Pat. No. 3,678,570. Another form, one which utilizes multiple foils containing boron, is illustrated in U.S. Pat. No. 4,700,881.

One of the problems with TLP bonding is that it is a long process in which heat must be applied for hours. As a result, boron or other melting point depressants in the interlayer foil prematurely diffuse into the parent materials. If a proportionately large amount of boron diffuses out of the interlayer foil, only partial melting may occur. In a worst case scenario, no melting at all may occur. To counter these problems, larger quantities of boron have been added to the interlayer foil to ensure that enough will be present to cause the joint to melt. However, since it is intended that boron diffuse away from the joint as time at bonding temperature is accumulated (and therefore allow the joint to solidify isothermally at bonding temperature), large doses of this element in the foil can eventually cause degradation of the base material. Yet another problem is that the TLP process cannot produce the high strength, near-parent metal properties for large components since slow rates of isothermal heating and cooling of the associated massive tooling, fixturing, and components is required.

Another process for joining metallic materials together is Forge Joining. The forge joining process involves positioning the two metallic materials to be joined adjacent to each other, locally heating the interface to a temperature within the solution temperature range of both alloys, applying a load sufficient to produce deformation in one of the metallic materials at the interfacial surface so as to form a solid state bond between the metallic materials, removing the bonding force, and subjecting the bonded assembly to a local or isothermal heat treatment so as to minimize distortion, optimize properties, and stress relieve the bonded assembly. U.S. Pat. No. 5,272,809 illustrates a bonding process of this type.

The forge joining process has the disadvantage of requiring an appreciable forge-upset at the bond line to ensure that oxide films are broken up and that intimate contact is made between the bond surfaces. This is a problem when one is trying to join finished machined or near net shape components where dimensional tolerance is required in the post-bond condition. In other words, forge-joining can produce high strength properties, but large deformation at the component interfaces is required which sacrifices the requirement for precise positioning for hollow disk fabrication and drum rotor interstage replacement.

Still another bonding process which is used is known as diffusion bonding. U.S. Pat. No. 5,145,105 illustrates this type of bonding process.

There still remains a need for a process for bonding metallic materials together which results in a high strength joint having strength properties similar to those of the materials being joined. There also remains a need for a bonding process which avoids the problems of the aforementioned prior art bonding methods.

SUMMARY OF THE INVENTION

Accordingly, it is an object of the present invention to provide a process for bonding metallic components which results in improved joint structural behavior.

It is another object of the present invention to provide a process as above which provides near-ideal microstructure across the joint, enhanced dimensional control and an integrated, production oriented, bond/heat treatment cycle.

It is still another object of the present invention to provide a process as above which produces near-net shape components with near-parent metal properties throughout.

The foregoing objects are attained by the process of the present invention.

A process for bonding two metallic materials together in accordance with the present invention broadly comprises the steps of: providing two parent metal members to be joined and a prealloyed interlayer foil having a melting point depressant incorporated into its composition; creating a joint interface by positioning said interlayer foil between two spaced apart surfaces of said two parent metal members to be joined together; applying a load substantially transverse to said joint interface which does not cause deformation of said surfaces; and applying localized, rapid heating in the area of said joint interface at a temperature sufficient to effect bonding of said two parent metal members with substantially no diffusion of said melting point depressant into the material forming the metallic members prior to melting of the foil, while causing no degradation of microstructure or mechanical properties of the parent metal, and to effect coarsening of grains in rim portions of the metal members so as to form creep resistant rim portions. The process of the present invention has particular utility in the bonding of superalloy materials.

Other details of the process of the present invention, as well as other objects and advantages, are described in the following detailed description and the accompanying drawings wherein like reference numerals depict like elements.

DETAILED DESCRIPTION OF THE PREFERRED EMBODIMENT(S)

Figure 1:
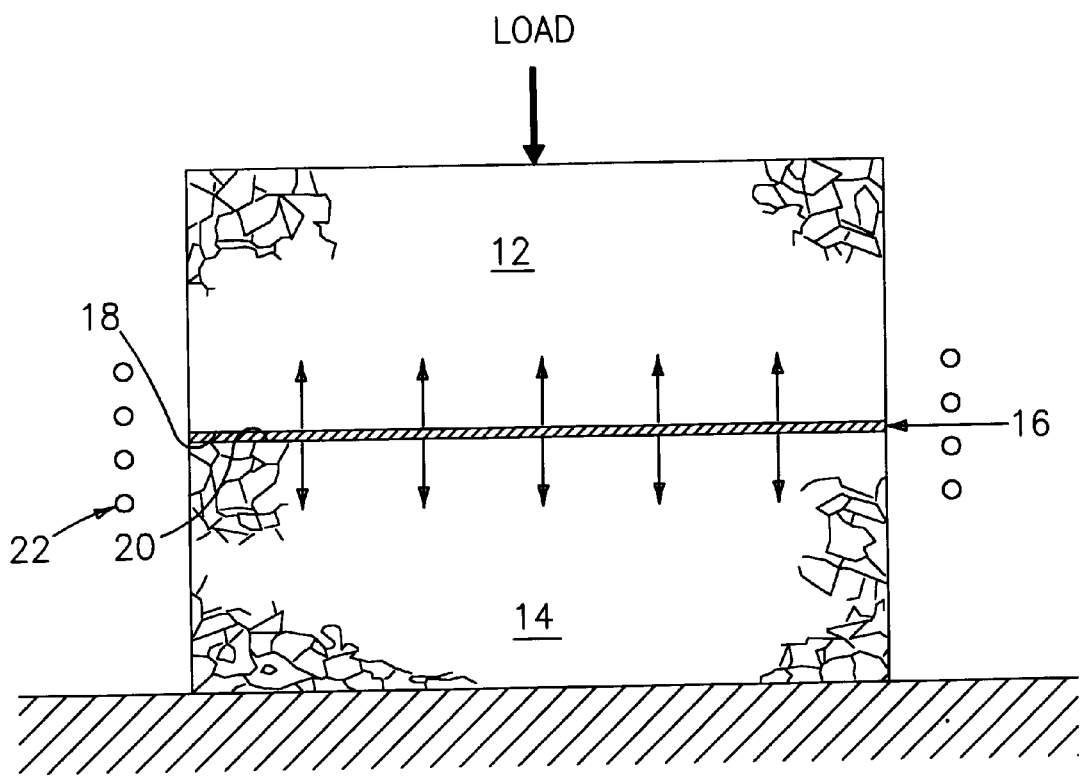
FIG. 1 is a schematic representation of the manner in which two metal members are to be joined together.

Referring now to the drawings, FIG. 1 illustrates two metal members or components 12 and 14 to be joined together. The metal members may comprise any solid or hollow components and may be formed from any suitable metallic material known in the art such as a titanium-based or nickel-based superalloy. Each metal member, for example, could be formed from a IN100 nickel-base alloy.

Prior to commencing the bonding process of the present invention, the surfaces 18 and 20 of the metal members 12 and 14 to be joined are machined substantially parallel. It has been found to be desirable for each mating surface to have a finish of 32 AA microns or better. Any suitable means known in the art may be used to machine the surfaces. After machining, the surfaces 18 and 20 to be joined together are immersed in a cleaning solution. Any cleaning solution known in the art may be used to remove deleterious matter and other contaminants from the surfaces 18 and 20.

As shown in FIG. 1, a piece of interlayer foil 16 is positioned between the two metal members so as to form a joint interface. The interlayer foil 16 preferably comprises a low melting point, prealloyed foil having a eutectic composition, or near eutectic composition, throughout its thickness. The foil 16 has a composition which contains a constituent, such as boron or silicon, which depresses the melting point of the material forming the foil, thereby permitting local melting and subsequent isothermal solidification of the joint. One composition which has been found to be useful for the interlayer foil 16 when bonding metal members formed from a nickel based alloy is a prealloyed foil having a nominal composition of 15 wt % chromium, 3 wt % boron, and the balance essentially nickel. This foil composition has been found to be good for creating a joint have excellent mechanical properties such as strength and ductility.

In order to facilitate the fabrication of a joint having strength properties similar to those of the parent material in the metal members 12 and 14, it is desirable that the interlayer foil 16 have a relatively small thickness. It has been found that foils having a thickness in the range of about 0.0005 inches to about 0.005 inches are most useful. Preferably, the foil should have a thickness in the range of about 0.002 inches to about 0.004 inches and most preferably, a thickness in the range of about 0.002 inches to about 0.003 inches. If the foil has a thickness greater than 0.005 inches, it has been found that the mechanical properties of the joint fall off dramatically.

During the bonding process of the present invention, a load is applied substantially transverse to the joint interface to urge the metallic members 12 and 14 together. The load may be applied either by dead weight (gravity), a hydraulic cylinder, or by virtue of differential thermal expansion. Differential thermal expansion however is not as desirable as the other two techniques mentioned above because of a lack of precise control. The load applied during the bonding operation should not be so large that any significant plastic deformation is caused in the surfaces 18 and 20. Any plastic deformation which is caused should be in the order of only a few ten-thousandths of an inch. Loads in the range of about 0.01 to about 5.0 ksi, preferably in the range of about 0.06 to about 5.0 ksi, have been found to be quite useful in the process of the present invention.

The process of the present invention avoids problems associated with prior art techniques by using localized, rapid heating at the joint interface to form a joint having very desirable properties and characteristics. Localized heating may be defined as preferential heating of only the joint interface region as compared to overall heating which heats the entire part. The localized rapid heating is applied for a time, preferably 1 to 2 hours, so that the interlayer foil melts and forms a liquid phase at the interface. The heating temperature is selected to accomplish melting of the foil and certain other objectives. For example, the applied temperature should be such that rim portions of the parent metals experience grain coarsening and a coarse grain rim microstructure is achieved. In this way, a creep resistant, damage tolerant material is created at the rim. Additionally, the temperature should be such that a full solution heat treat of the parent alloy occurs. It has been found that a temperature close to the melting point of the parent metal, i.e. within 50°–60° F. of the parent metal melting point, accomplishes these results. At this temperature, the parent material is also substantially homogenized. In the case of parent metals formed from a nickel-based alloy such as IN100, a temperature in the range of about 2125° F. to about 2200° F. is useful. This localized heating distinguishes the process of the present invention from other joining or bonding processes such as transient liquid phase bonding wherein heat is applied across the entire thickness of the metal members being joined. The localized heating may be applied by induction or resistance heating. For example, an induction coil 22 may be used to provide the localized heating in the vicinity of the joint interface.

The process of the present invention further utilizes local, controlled rate, rapid cooling at the joint interface to promote high strength. The localized cooling takes place at a rate of about 100° F. per minute to about 800° F. per minute, preferably about 200° F. per minute. To effect cooling, power is turned off to the induction coil or resistance heater and the joint exposed to a quench medium such as helium.

The bonding process of the present invention is performed in a vacuum or an inert environment. The vacuum may be applied during the bonding process using any suitable means known in the art. Similarly, if an inert environment is used, it may be created in any suitable fashion known in the art.

During the localized rapid heating used in the process of the present invention, the depressant in the foil diffuses outwardly towards the surfaces 18 and 20. A minimal amount of depressant, and preferably substantially none, diffuses into the metallic material at the surfaces 18 and 20. Following melting of the foil, diffusion of the melting point depressant occurs and the joint solidifies isothermally, i.e. at the bonding temperature. Upon completion of the heating cycle, the locally heated joint is cooled rapidly as previously discussed to promote high strength properties in the joint, which are similar to the properties of the material forming the parent metal members. Localized heating is a key to the process of the present invention because this allows the unheated portion of the metallic members 12 and 14 to act as a heat sink to rapidly induction-cool the joint region.

After the joint has been cooled, the joined metal members 12 and 14 are isothermally stress-relieved and aged. Stress relief may be performed in a furnace at a temperature of 1800° F. for up to one hour, preferably about 45 minutes. The aging treatment may also be conducted in a furnace at a temperature of about 1350° F. for 8 hours. By performing the stress relief and aging steps, it is possible to avoid a high temperature re-solution heat treatment of the entire assembly.

The bonding process of the present invention offers distinct advantages over conventional transient liquid phase bonding (TLP). Using a 200 lb part as an example, TLP takes a total of 4 hours for a typical furnace heat treatment compared to a total of 2 hours using the localized approach. While this also enhances process economy by shortening the overall process time, the true value of rapid heating is the elimination of prealloyed boron or other melting point depressants from prematurely diffusing from the prealloyed foil interlayer 16 into the metallic materials forming the metal members 12 and 14. During heating, a certain amount of the melting point depressant will unavoidly begin to diffuse out of the foil prior to reaching the designated melting point. During slow heating, such as is the case with the isothermally heated TLP process, a proportionately larger amount of boron diffuses out of the foil, prior to the onset of melting, which may result in only partial melting or perhaps no melting at all. To counter this in conventional TLP processing, it is necessary to add larger quantities of boron to ensure that enough will be present to cause the joint to melt. However, higher concentrations of boron can degrade the mechanical properties of most alloys, and since it is intended to diffuse the boron into the parent material, it is desirable to keep the boron at the lowest possible level. In contrast, the localized, rapid heating of the process of the present invention allows use of low melting point depressant content bond foil which minimizes the amount of the element that diffuses into the metallic material forming the metal members 12 and 14.

The localized heating and rapid cooling aspects of the process of the present invention are advantageous from the standpoint of preserving mechanical properties of the joint and controlling component dimensions. For example, conventional bonding methods often employ differential expansion tooling which requires isothermal heating of the entire component. This technique results in ultra slow cooling rates due to the combined mass of tooling, fixturing and the actual hardware and results in mechanical property debits in tensile and fatigue capability. Rapid heating and cooling rates cannot be achieved with the TLP type process using isothermal heating of both component and tooling due to the mass of the system. While these properties can generally be recovered by subsequent reheat treatment, this will occur at the expense of dimensional control of final machined or near final machined hardware such as hollow disks, drum rotors and IBR blade repairs.

Figure 4:
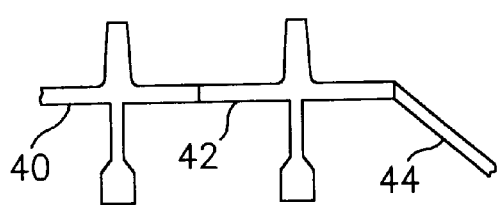
FIGS. 4 and 5 illustrate various parts which can be joined using the process of the present invention.
Figure 5:
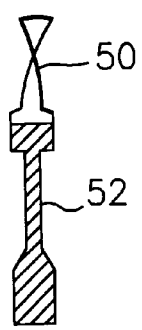

Another significant advantage of the process of the present invention is the precision fit-up and low process induced deformation. A critical consideration when joining finish machined or near-net shape components is the dimensional tolerance required in the post-bond condition. Forge-Joining components such as hollow disk halves, drum rotor stages, and IBR replacement blades require an appreciable forge-upset at the bond line to ensure that oxide films are broken up and that intimate contact is made between the bond surfaces. The process of the present invention, on the other hand, requires only that the surfaces to be bonded are sufficiently close so that the melted interlayer material can fill any surface asperities or gaps. Bond loads in this process can thus be quite low, thereby minimizing deformation of the component and promoting precise location of surfaces such as the hollow disk segments. Since machined bond surfaces can be brought into line-on-line contact with only a minimal application of load, interlayer foil thickness can be reduced to the minimum required to ensure a sound metallurgical bond. This is important since as discussed hereinafter thinner interlayer foils result in a thinner melted region that must be subsequently homogenized by diffusion. This in turn reduces the time necessary to achieve a sound joint and results in a more cost efficient process. The low deformation is critical for precision positioning of drum rotor stages wherein various drum sections 40, 42 and 44 must be bonded together as shown in FIG. 4, for repairing IBR blades by bonding a replacement blade 50 to a rotor 52 as shown in FIG. 5.

Figure 2:
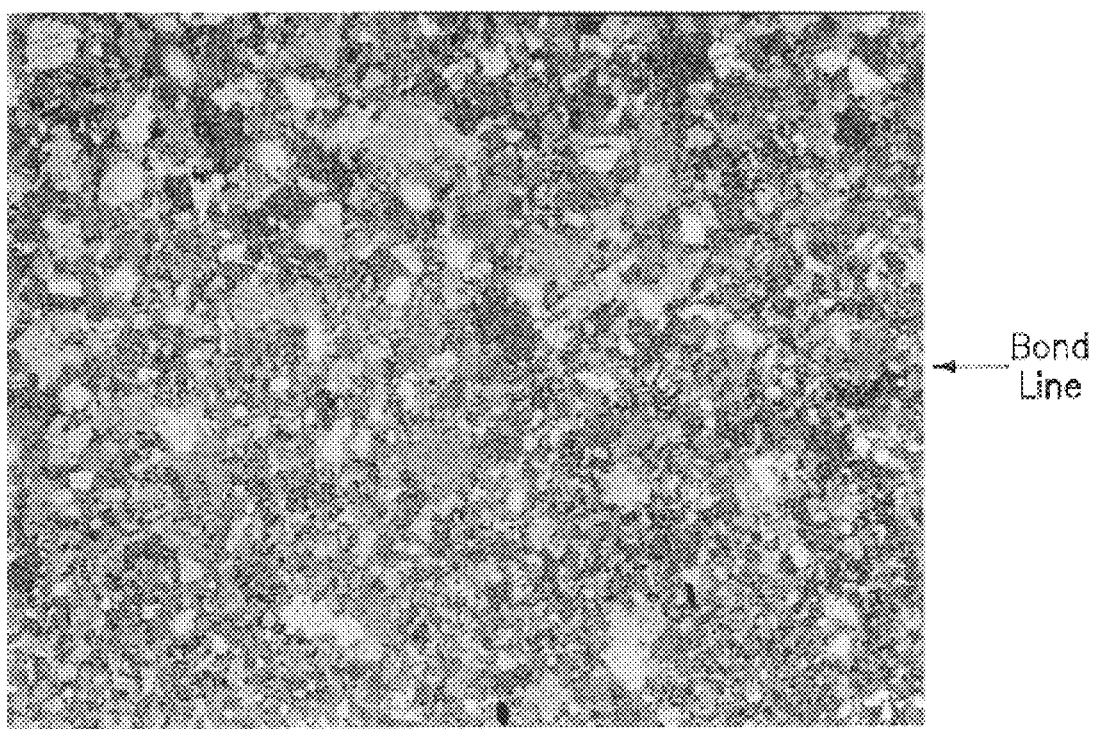
FIG. 2 is a 100× photomicrograph of the microstructure of a joint formed using the process of the present invention.
Figure 3:
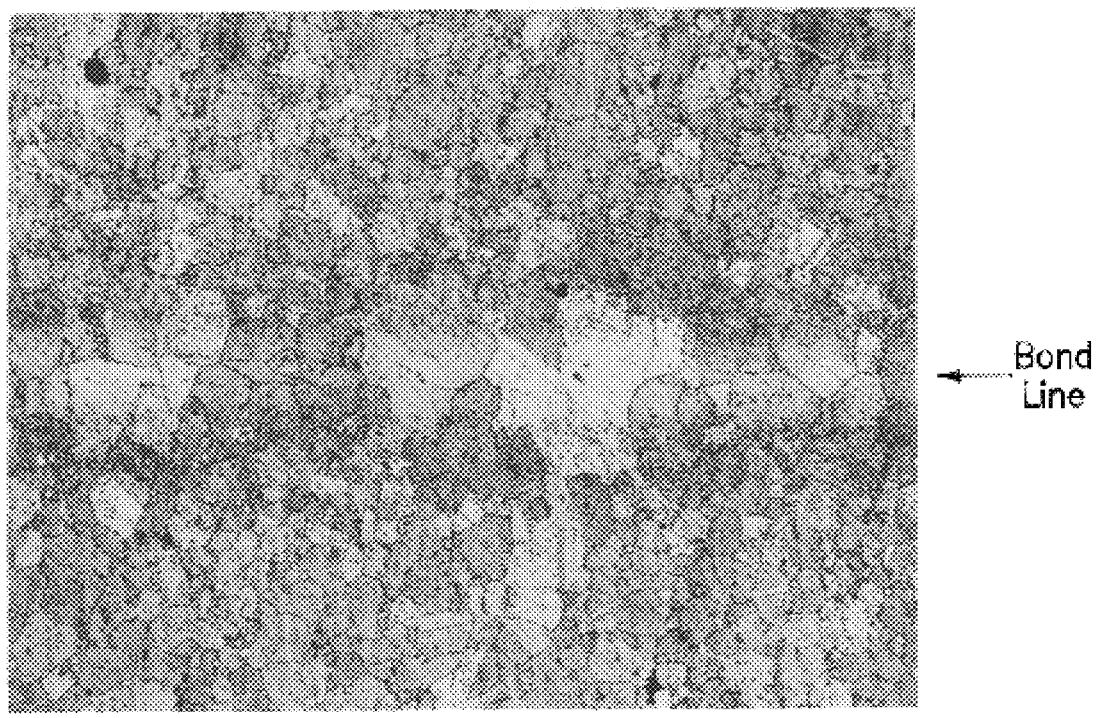
FIG. 3 is a 200× photomicrograph of the microstructure of a joint formed using the process of the present invention.

The use of a prealloyed interlayer foil in the process of the present invention is also quite significant. The prealloyed interlayer foil, when employed to bond nickel-base alloys, contains boron as a melting point depressant. In an ideal situation, where the bond joint is heated very rapidly, at the instant of melting, the concentration of boron in the melted region is uniform through the thickness of the foil being melted. As time proceeds, boron begins to move into the substrate according to well known laws of diffusion, creating a concentration gradient. The highest concentration of boron remains at the center of the melted joint and decreases toward the interface between the substrate and the melt. When the critical value of boron concentration is reached, solidification will commence. Since the boron concentration is lowest at the interface, solidification will begin there and proceed inward (toward the opposite interface). Because, in this situation, solidification has been forced to occur at the interface, it will grow inward epitaxially, i.e. solidification will occur by growth of the atomic planes one on top of another such that the microstructure of the parent metal is duplicated in the solidifying region. This is why bond joint mechanical properties can theoretically match the properties of the metal members being joined when the process of the present invention is utilized. To ensure that the ideal situation described above is achieved, it is necessary to produce a rapid heating rate during the bond cycle. FIGS. 2 and 3 show the resulting microstructure for IN100 nickel-base alloy members joined together using the process of the present invention and a prealloyed foil interlayer having a nominal composition of NI-15 wt % Cr-3 wt % B. The complete absence of a physical bond line and the complete grain growth achieved across the joint interface should be noted. In addition, it should be noted that there are no continuous carbide or boride phases as are typically observed in joints formed using the TLP process.

While the present invention has been described in the context of joining two metal members having the same composition together, the process of the present invention can be used to join two metal members having dissimilar compositions.

If the two metal members to be joined are titanium based alloys, the foil interlayer can be formed from a titanium based alloy having a depressant constituent.

While it is preferred to use a single piece of interlayer foil between the metal members to be joined, the process of the present invention may be performed with multiple foil layers at the joint interface.

It is apparent that there has been provided in accordance with the present invention a process for bonding two metallic materials which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for joining two metallic materials together comprising the steps of:
   providing two parent metal members to be joined and a prealloyed interlayer foil having a composition which includes a melting point depressant;
   creating a joint interface by positioning said interlayer foil between two spaced apart surfaces of said two parent metal members to be joined together;
   applying a load substantially transverse to said joint interface so as not to cause deformation of said surfaces; and
   creating a creep resistant, damage tolerant material at rim portions of the parent metal members by applying localized, rapid heating in the area of said joint interface for a time of 1 to 2 hours at a temperature which effects bonding of said two parent metal members while causing a coarsening of grains in rim portions of said metal members so as to form creep resistant rim portions.

2. The process of claim 1 wherein said heating step further comprises applying said localized, rapid heating so as to create a melt where said depressant has its lowest concentration where said two surfaces to be joined meet said melt and so as to promote solidification of said joint inwardly from each of said surfaces.

3. The process of claim 1 further comprising:
   aligning said two parent metal members and said interlayer foil; and
   said load applying step further comprises applying a load which does not disturb the alignment of said two parent metal members and said interlayer foil.

4. The process of claim 1 wherein said prealloyed foil providing step comprises providing a piece of foil having a thickness in the range of about 0.0005 inches to about 0.005 inches.

5. The process of claim 1 wherein said prealloyed foil providing step comprises providing a piece of foil having a thickness in the range of about 0.002 inches to about 0.004 inches.

6. The process of claim 1 wherein said prealloyed foil providing step comprises providing a piece of foil having a thickness in the range of about 0.002 inches to about 0.003 inches.

7. The process of claim 1 wherein said prealloyed foil providing step comprises providing a nickel alloy foil material having boron as a melting point depressant.

8. The process of claim 1 wherein said prealloyed foil providing step comprises providing a foil having a composition consisting essentially of 15 wt % chromium, 3 wt % boron and the balance essentially nickel.

9. The process of claim 1 wherein said load applying step comprises applying a load in the range of about 0.01 ksi to 5.0 ksi.

10. The process of claim 1 wherein said load applying step comprises applying a load in the range of about 0.06 ksi to about 5.0 ksi.

11. The process of claim 1 wherein said heating step comprises heating by induction heating in order to rapidly generate heat in said joint interface.

12. The process of claim 1 wherein said heating step comprises heating by resistance heating in the vicinity of said joint interface in order to rapidly generate heat in said joint interface.

13. The process of claim 1 further comprising bonding said two metallic members together in a vacuum or an inert atmosphere.

14. The process of claim 1 further comprising rapidly cooling said joint interface in a localized manner to promote high strength properties.

15. The process of claim 14 wherein said cooling occurs at a rate in the range of about 100° F. per minute to about 800° F. per minute.

16. The process of claim 1 further comprising stress relieving said joined metal members and thereafter aging said joined metal members.

17. The process of claim 1 wherein said parent metal member providing step comprises providing two hollow metallic components to be joined together.

18. A process for bonding two metal components comprising the steps of:
   providing two metal components to be joined, each of said metal components being formed from a superalloy selected from the group consisting of a titanium-based superalloy and a nickel-based superalloy;
   forming a joint interface by positioning a prealloyed interlayer foil containing a melting point depressant between said two superalloy components; and
   applying localized, rapid heat in the vicinity of the joint at a temperature and for a time in the range of 1 to 2 hours to cause the prealloyed foil to melt, to cause said melting point depressant in said prealloyed foil to form a concentration gradient wherein the highest concentration of the melting point depressant remains at the center of the melted joint and decreases toward each interface between the melt and each superalloy component, to cause solidification to begin at each melt/superalloy component interface and proceed inwardly so that the microstructure of the metal components is duplicated in the solidifying region and to cause coarsening of grains in rim portions of said superalloy members so as to form creep resistant rim portions.

19. The process of claim 18 wherein the step of providing two metal components comprises providing two hollow components.

20. The process of claim 18 wherein said heat applying step comprises applying localized, rapid heat using an induction coil.

21. The process of claim 18 further comprising applying a load in the range of about 0.01 ksi to about 5.0 ksi substantially transverse to said joint interface without causing any upset in said metal components.

22. The process of claim 15 wherein said load applying step comprises applying a load of about 0.01 ksi to 0.06 ksi.

23. The process of claim 18 further comprising placing surfaces of said two metal components to be bonded together sufficiently close that the material of the foil interlayer in a melted state can fill any surface asperities or gaps.

24. A process for bonding two members each formed from a superalloy comprising the steps of:

providing two metal members to be joined, each of said metal members formed from a superalloy selected from the group consisting of titanium-based superalloys and nickel-based superalloys; and forming a joint between said two members characterized by the absence of any physical bond line, by substantially complete grain growth across a joint interface, the absence of continuous carbide and boride phases in the joint interface, and a coarsening in grain size at rim portions of said two members so as to form creep resistant rim portions, said joint forming step comprising applying localized, rapid heating in the area of said joint interface for a time in the range of 1 to 2 hours and at a temperature which effects said joint formation and said coarsening.

25. The process of claim 24 wherein said joint forming step comprises:

placing a prealloyed interlayer foil having a eutectic or near eutectic composition containing a melting point depressant between said two metal members; and applying localized rapid heating in the area of said joint interface at said temperature and for a time to effect bonding of the two metal members with substantially no diffusion of said melting point depressant into the material forming the metal members prior to melting of the foil.

26. A process for joining at least two drum sections formed from a metallic material together, said process comprising the steps of:

providing at least two drum sections to be joined together and at least one prealloyed interlayer foil having a composition which includes a melting point depressant;

creating a joint interface by positioning each said interlayer foil between two spaced apart surfaces of said at least two drum sections to be joined together;

applying a load substantially transverse to said joint interface so as not to cause deformation of said surfaces; and applying localized, rapid heating in the area of said joint interface for a time in the range of 1 to 2 hours and at a temperature which effects bonding of said at least two drum sections while causing a coarsening of grains in rim portions of said at least two drum sections so as to form creep resistant rim portions.

27. A process for bonding a replacement blade to a rotor, said process comprising the steps of:

providing a replacement blade and a rotor to be joined together and a prealloyed interlayer foil having a composition which includes a melting point depressant;

creating a joint interface by positioning said interlayer foil between spaced apart surfaces of said replacement blade and said rotor to be joined together;

applying a load substantially transverse to said joint interface so as not to cause deformation of said surfaces; and applying localized, rapid heating in the area of said joint interface for a time in the range of 1 to 2 hours and at a temperature which effects bonding of said replacement blade to said rotor while causing a coarsening of grains in rim portions of said replacement blade and said rotor so as to form creep resistant rim portions.

28. The process of claim 1 wherein said heating step comprises heating said joint interface to a temperature within about 50 to about 60° F. of the parent metal melting point.

29. A process according to claim 18, wherein said step of applying localized, rapid heat comprises heating said joint to a temperature within about 50 to 60° F. of the melting point of at least one of said metal components.

30. A process according to claim 24, wherein said joint forming step comprises applying heat in the area of said joint interface at a temperature within about 50 to about 60° F. of the melting point of at least one of the metal members being joined.

31. A process according to claim 26, wherein said localized, rapid heating applying step comprises heating said joint to a temperature within about 50 to about 60° F. of the melting point of at least one of said at least two drum sections.

32. A process according to claim 27, wherein said localized, rapid heating applying step comprises heating the area of said joint to a temperature within about 50 to about 60° F. of the melting point of at least one of the material forming said replacement blade and the material forming said rotor.

* * * * *